UNITED STATES PATENT OFFICE.

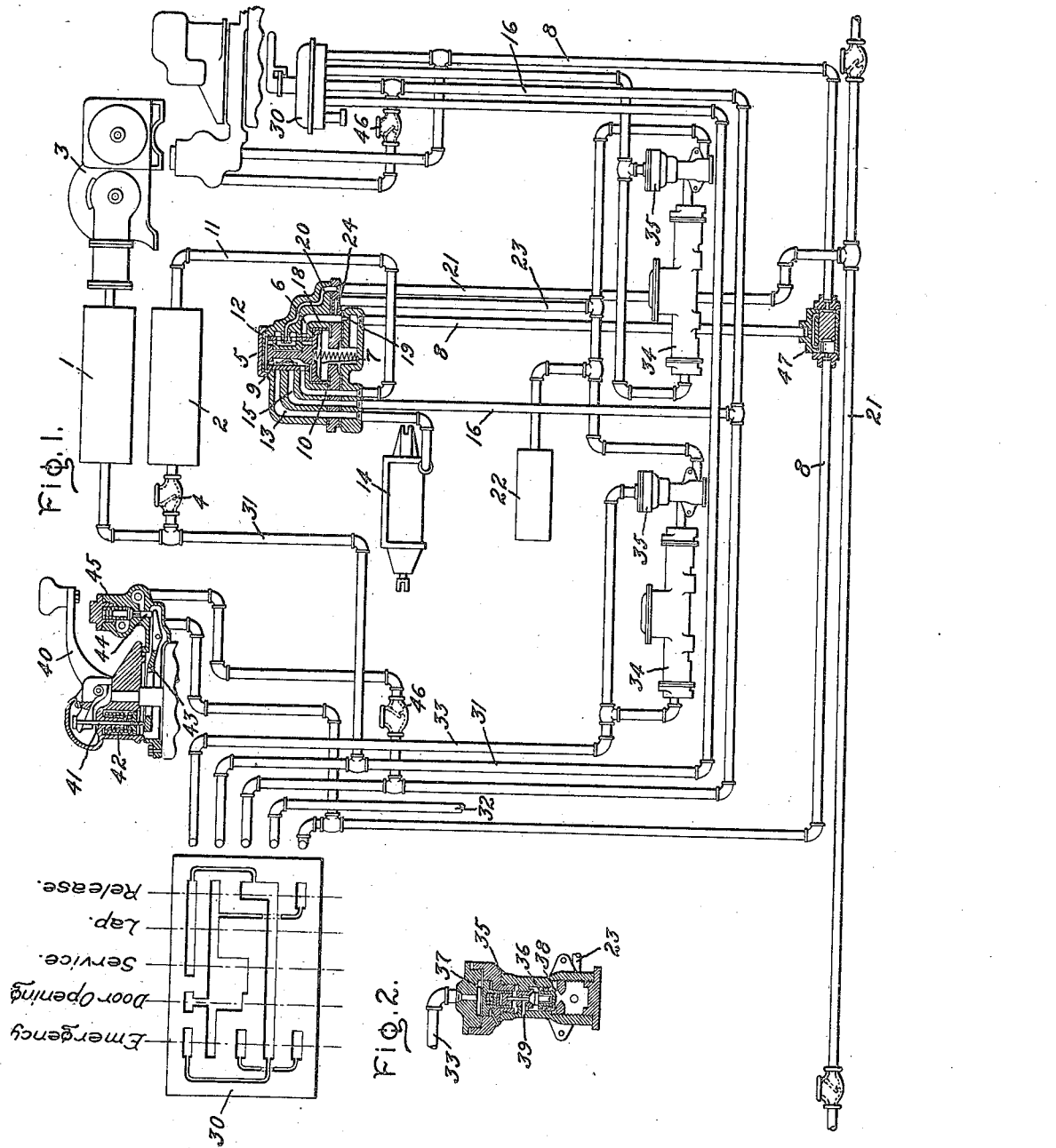

GEORGE MACLOSKIE, OF ERIE, PENNSYLVANIA, ASSIGNOR TO GENERAL ELECTRIC COMPANY, A CORPORATION OF NEW YORK.

SAFETY CAR CONTROL AND AIR-BRAKE EQUIPMENT.

1,426,893.

Specification of Letters Patent.  Patented Aug. 22, 1922.

Application filed April 22, 1921. Serial No. 463,606.

*To all whom it may concern:*

Be it known that I, GEORGE MACLOSKIE, a citizen of the United States, residing at Erie, in the county of Erie, State of Pennsylvania, have invented certain new and useful Improvements in Safety Car Control and Air-Brake Equipments, of which the following is a specification.

My invention relates to safety car control and air brake equipments.

One object of my invention is to provide a new and improved safety car control and air brake equipment which requires a minimum amount of apparatus.

Another object of my invention is to provide a new and improved arrangement of apparatus whereby the brakes of a car are always applied when the motorman releases the operating handle at the operating end of the car, and whereby the brakes may be released from the opposite end of the car.

Another object of my invention is to provide a new and improved arrangement of apparatus for controlling the car doors whereby only one pipe connection is necessary between each door engine and each motorman's brake valve and whereby each door engine may be operated by hand whenever an emergency application of the brakes is made.

A further object of my invention is to provide a new and improved arrangement of apparatus for sanding the rails when an emergency application of the brakes is made and for connecting the emergency pipe to atmosphere when the emergency valve is in the emergency position so that the pressure in the emergency pipe cannot build up due to leakage in the equipment.

My invention will be better understood from the following description taken in connection with the accompanying drawing, and its scope will be pointed out in the appended claims.

In the accompanying drawing, Fig. 1 is a diagrammatic view partly in section of a double end safety car control and air brake equipment embodying my invention; and Fig. 2 is a section of a door operating valve which may be used.

In the accompanying drawing, 1 and 2 represent main reservoirs supplied with fluid under pressure from an air compressor 3 and connected together by means of a one-way check valve 4 so that fluid can flow only from the reservoir 1 to the reservoir 2. An emergency valve 5 is provided and comprises a piston 6, a piston chamber 7 connected to an emergency pipe 8, and a valve chamber 9 connected by means of a passage 10 and a pipe 11 to the main reservoir 2 and containing a slide valve 12 connected to the piston 6. The slide valve 12 is provided with suitable ports so that when it is in its normal position, it establishes communication between a passage 13 leading to the brake cylinder 14 and a passage 15 leading to the straight air pipe 16 so that a straight air application of the brakes may be made without effecting the operation of the emergency valve. The slide valve 12 is also arranged so that when the emergency valve is in its emergency position communication is established between the passage 13 and the valve chamber 9 and between a passage 18, connected to the piston chamber 7 by means of the restricted passage 19, and a passage 20 to which is connected a sanding pipe 21. A sanding reservoir 22 is connected to the piston chamber 7 by means of a pipe 23 and passages 24 and 19. Since the emergency pipe 8 is normally supplied with fluid under pressure, it will be apparent that the sanding reservoir 22 is normally charged with fluid under pressure.

At each operating end of the car, a motorman's brake valve 30 of any suitable construction is provided for controlling the air brakes. Each one of these motorman's brake valves is connected to the straight air pipe 16, the emergency pipe 8 and a main reservoir pipe 31, which is connected to the main reservoir 1. Each motorman's brake valve 30 is also provided with an exhaust pipe 32 and a door pipe 33 which is connected to the door-opening side of a door engine 34. As shown in the drawing, each motorman's brake valve 30 is arranged to control a separate door engine 34. A development of a motorman's brake valve, which may be used, is shown in the drawing.

The door-closing side of each door engine 34 is normally connected by means of a door operating valve 35 to the pipe 23 which is connected to the sanding reservoir 22. Each door-operating valve 35, a section of which is shown in Fig. 2, comprises a double beat valve 36 which is adapted to be operated by a diaphragm 37, one side of which is subject to the pressure in the door pipe 33 leading to the motorman's brake valve 30 which controls the operation of the door engine. When there is no pressure in the door pipe 33, the double beat valve 36 of the door engine is held in the position shown in the drawing by a spring 38 so as to establish communication between the door-closing side of the door engine and the pipe 23. When, however, pressure is supplied to the door pipe 33, the diaphragm 37 is moved downwardly and operates the double beat valve 36 to cut off communication between the door-closing side of the door engine 34 and the pipe 23 and to establish communication between the door-closing side of the door engine and the exhaust passage 39. Each door engine 34 may be of the well known construction, whereby the doors controlled thereby are opened when fluid under pressure is supplied to the door-opening side of the engine and the door-closing side is connected to atmosphere and whereby the doors are closed when fluid under pressure is supplied to the door-closing side of the engine and the door-opening side is connected to atmosphere.

At each end of the car means are provided for connecting the emergency pipe 8 to the straight air pipe 16 when the motorman releases one of his operating handles. In the arrangement shown, this connection is adapted to be established whenever the motorman releases the handle of his controller. Each controller is provided with a handle 40 having a rearwardly-extending finger adapted to engage the head of a plunger bolt 41 which is acted upon by a coil spring 42. When the handle 40 is released, the bolt 41 is arranged to engage one end of a pivoted lever 43, the opposite end of which engages a pilot valve 44 which controls a communication between the straight air pipe 16 and the emergency pipe 8. The pilot valve 44 is normally held in its closed position by means of a spring 45. A one-way check valve 46 is provided in the communication between the straight air pipe 16 and the emergency pipe 8 and is so arranged that fluid can flow only from the emergency pipe 8 to the straight air pipe 16.

A double check valve 47 is provided in the emergency pipe 8 to control the communication between the piston chamber 7 and the pilot valve 44 at each operating end of the car.

The operation of the equipment shown is as follows:—Let it be assumed that the check valve 47 is in the position shown, that the car is being operated from the end where the motorman's brake valve 30, whose development is shown in the drawing, is situated, that this motorman's brake valve is in the release position and that the controller handle 40 at this end of the car is depressed so that the communication between the emergency pipe 8 and the straight air pipe 16 through the check valve 46 at this end of the car is cut off. At the non-operating end of the car the motorman's brake valve 30 is in the lap position at this time and the controller handle 40 is released. Under these conditions, communication is established between the emergency pipe 8 at the non-operating end of the car and the straight air pipe 16 which is connected at this time to atmosphere by means of the motorman's brake valve 30 at the operating end of the car. Since the motorman's brake valve 30 at the operating end of the car establishes communication between the emergency pipe 8 at this end and the main reservoir pipe 31, it is evident that the check valve 47 is moved to the position shown, if it is not already there, when the motorman's brake valve at the operating end is moved into the release position, as at this time main reservoir pressure is supplied to one side of the check valve 47 whereas the other side is connected to atmosphere. The double check valve 47, when in the position shown, establishes communication between the piston chamber 7 of the emergency valve and the portion of the emergency pipe 8 which extends to the operating end of the car and cuts off communication between the piston chamber 7 and the portion of the emergency pipe 8 which extends to the non-operating end of the car.

The sanding reservoir 22 is also charged with fluid under pressure from the piston chamber 7 through the restricted passage 19, the passages 18 and 24 and the pipe 23. Since at this time both of the door pipes 33 are connected to atmosphere by the corresponding motorman's brake valves 30, fluid pressure is also supplied through each door operating valve 35 to the door-closing side of each door engine to maintain all of the car doors closed.

If the motorman desires to make a service application of the brakes, he moves the motorman's brake valve 30 at the operating end of the car to the service position without releasing the controller handle 40. In this position of the motorman's brake valve the straight air pipe 16 is connected to the main reservoir pipe 31 so that fluid is supplied through the passage 15, ports in the slide valve 12 and passage 13 of the emergency valve to the brake cylinder 14. In order to prevent the portion of the emergency pipe 8, which extends to the non-operating end of the car, from being supplied with fluid each time a service application of the brakes is made, the one-way check valve 46 is provided in the communication which is established between the emergency pipe 8 and the straight air pipe 16 by the release of the controller handle. After a service application, the brakes may be released by moving the motorman's brake valve at the operating end of the car to the release position, in which position the straight air pipe 16 is connected to the exhaust pipe 32.

If the motorman desires to open the doors while making or after making a service application of the brakes. he moves the motorman's brake valve to the door-opening position, in which position the main reservoir pipe 31 is connected to the door pipe 33 at the operating end of the car so that fluid under pressure is supplied to the door-opening side of the corresponding door engine 34. Fluid under pressure is also applied to the top of the diaphragm 37 of the door operating valve 35 at the operating end of the car. The diaphragm 37 then moves downwardly and operates the double beat valve 36 of the door operating valve 35 so that communication is cut off between the pipe 23 and the door-closing side of the door engine 34 and communication is established between the door-closing side of the door engine and the exhaust pipe 39. The door engine 34 at the operating end of the car is, therefore, operated to open the car doors controlled thereby. To close these doors, the motorman's brake valve is moved to the lap or release position depending upon whether it is also desired to release the brakes, in which position the door pipe 33 at the operating end of the car is connected to atmosphere.

If the motorman desires to make an emergency application of the brakes, he moves the motorman's brake valve 30 at the operating end of the car to the emergency position. In this position of the motorman's brake valve 30 the door pipe 33 at the operating end of the car is connected to atmosphere and the emergency pipe 8 is connected to the straight air pipe 16. The establishment of communication between the emergency pipe 8 and the straight air pipe 16 causes fluid to be vented from the emergency pipe so that the pressure in the piston chamber 7 of the emergency valve 5 is reduced. This reduction of the pressure in the piston chamber 7 causes the emergency piston 6 to move to its emergency position, in which position fluid is supplied from the main reservoir 2 directly to the brake cylinder 14 through the passage 13.

When the emergency piston 6 is in the emergency position the ports of the slide valve 12 connect the passage 18, which is normally connected to the valve chamber 9, to the passage 20 leading to the sanding pipe 21. Fluid under pressure is thereby supplied from the sanding reservoir 22 through the pipe 23, passages 24 and 18 to the sanding pipe 21. By properly designing the sanding reservoir 22 so that only just enough sand is supplied to the track to bring the car to a stop quickly, it will be evident that this arrangement will effect a great saving in fluid over a system in which air is supplied to the sanding pipe as long as the emergency valve is in the emergency position. The restricted passage 19 is constructed so that very little fluid flows to the piston chamber 7 while sand is being applied to the tracks.

Furthermore, it will be apparent that when the emergency valve is in the emergency position the fluid in the door-closing sides of the door engines 34 is also exhausted through the sanding pipe 21 so that there is no fluid pressure in either side of each door engine and consequently the doors may be opened easily by hand.

Since the piston chamber 7 and the emergency pipe 8 are connected to the sanding pipe 21 by the restricted passage 19, it is impossible for any pressure, due to a leakage in the equipment, to build up in the piston chamber and thereby restore the emergency piston 6 to its normal position.

It will therefore be apparent that when an emergency application of the brakes is made a certain definite amount of sand is applied to the rails, the door engines are placed in a condition so that they may be opened easily by hand and the emergency pipe is connected to atmosphere through a restricted passage so that it is impossible for the emergency valve to be restored to its normal position before it is desired to release the brakes.

The brakes may be released after an emergency application by moving the motorman's brake valve 30 at the operating end to the release position. In this position, the emergency pipe 8 is connected directly to the main reservoir pipe 31 through a restricted port in the motorman's brake valve. The passage in the motorman's brake valve through which fluid flows from the main reservoir pipe 31 to the emergency pipe 8 is much larger, however, than the restricted passage 19 in the emergency valve 5 so that the pressure in the piston chamber 7 builds up quickly and restores the emergency valve 5 to its normal position. In this position of the emergency valve, communication is established between the brake cylinder 14 and the straight air pipe 16 which is connected to atmosphere through the motorman's brake valve 30, thereby effecting the release of the brakes.

Let it now be assumed that the motorman releases the controller handle 40 at the operating end while the motorman's brake valve is in the release position. As soon as the handle 40 is released the plunger bolt 41 is actuated by the spring 42 so as to engage the lever 43 which is then operated to open the pilot valve 44 so that fluid under pressure is vented from the emergency pipe 8 to the straight air pipe 16 which is connected to atmosphere through the motorman's brake valve 30 at the operating end. The reduction in the emergency pipe pressure causes an emergency application of the brakes in the same manner as above described. As long as the handle 40 remains in its released position, the emergency valve 5 remains in its emergency position since the fluid which is supplied from the main reservoir pipe 31 to the emergency pipe 8 through the restricted passage in the motorman's brake valve 30 at the operating end, is vented through the pilot valve 44 to the straight air pipe 16 which is connected to atmosphere at this time by the motorman's brake valve at the operating end thereby preventing the pressure from building up in the emergency pipe 8. The brakes may be released by depressing the controller handle 40 thereby closing the communication between emergency pipe 8 and the straight air pipe 16 which is connected to atmosphere so that the pressure in the emergency pipe 8 builds up and restores the emergency valve 5 to its normal position in which position the brake cylinder is connected to the straight air pipe 16 which in turn is connected to atmosphere by the motorman's brake valve.

If the motorman releases the controller handle 40 while the motorman's brake valve is in the lap position, an emergency application of the brakes is also effected in the same manner as above described. The brakes are released in this case by first depressing the controller handle and then moving the motorman's brake valve to the release position.

If, however, the motorman makes a service application of the brakes and then releases the controller handle while the motorman's brake valve is in the lap position, an emergency application of the brakes is not effected by the release of the controller handle 40 because the straight air pipe 16 is filled with fluid pressure and, therefore, not enough fluid is vented from the emergency pipe to effect the operation of the emergency valve.

If the operator desires to go to the other end of the car, he first makes a service application of the brakes as above described, this action being desired so as to prevent accidents, due to the car running away, especially if the car happens to be on a grade. He then moves the motorman's brake valve to the lap position and releases the controller handle 40 at the operating end. An emergency application is not effected at this time as not enough fluid is vented from the emergency pipe to cause the emergency valve to move to its emergency position. When the motorman reaches the opposite end of the car he depresses the controller handle 40 at this end and then moves the motorman's brake valve 30 to the release position. In this position of the motorman's brake valve communication is established between the main reservoir pipe 31 and the portion of the emergency pipe 8 which extends to this end of the car and the straight air pipe 16 is connected to atmosphere so that whatever fluid remains in the portion of the emergency pipe 8 which extends to the former operating end of the car is vented therefrom. Consequently, since fluid is vented from the left hand side of the double check valve 47 and is supplied to the right hand side, as viewed in the drawing, the double check valve 47 is shifted to its left hand position so that it establishes communication between the piston chamber 7 and the portion of the emergency pipe 8 which extends to the new operating end and cuts off communication to the portion of the emergency pipe 8 which extends to the former operating end, thereby preventing an emergency application of the brakes being effected due to the controller handle at that end being released.

While I have shown and described one embodiment of my invention, I do not desire to be limited to this specific arrangement, but seek to cover in the appended claims all those modifications which fall within the true spirit and scope of my invention.

What I claim as new and desire to secure by Letters Patent of the United States, is:—

1. In a safety car control and air brake equipment, the combination with a source of fluid pressure, a brake cylinder, an emergency valve, an emergency pipe and a straight air pipe, of a motorman's handle, and a pilot valve operated upon release of said handle for venting fluid from said emergency pipe to said straight air pipe to effect the operation of said emergency valve to establish communication between said source of fluid pressure and said brake cylinder.

2. In a safety car control and air brake equipment, the combination with an emergency pipe and a straight air pipe, of a motorman's handle, a pilot valve operated upon release of said handle for venting fluid from said emergency pipe to said straight air pipe, and a valve device arranged to prevent fluid from flowing from said straight air pipe to said emergency pipe through said pilot valve when said handle is released.

3. In a safety car control and air brake equipment, the combination with an emergency pipe and a straight air pipe, of a one-way check valve, a motorman's handle, and a pilot valve operated upon the release of said handle to establish communication from said emergency pipe to said straight air pipe through said check valve.

4. In a safety car control and air brake equipment, the combination with an emergency valve and an emergency pipe, of means adapted to be operated at one end of the car to vent fluid from said emergency pipe to effect the operation of said emergency valve, and means in said emergency pipe controlled from the other end of the car for cutting off communication to the first means to prevent said first means from effecting the operation of said emergency valve.

5. In a safety car control and air brake equipment, the combination with an emergency valve, an emergency pipe, and a straight air pipe, of means adapted to be operated at one end of the car to vent fluid from said emergency valve through said emergency pipe to said straight air pipe, means at the other end of the car arranged to connect said straight air pipe to atmosphere and to supply fluid pressure to said emergency pipe, and a check valve operated by the fluid supplied to the emergency pipe through said second mentioned means for cutting off the communication through which fluid is vented at the other end of the car.

6. In a safety car control and air brake equipment the combination with a source of fluid pressure, a straight air pipe and an emergency pipe, of a valve device at each end of the car for venting fluid from said emergency pipe to said straight air pipe, a brake valve at each end of the car arranged in one position to connect said source of fluid pressure to said emergency pipe and to connect said straight air pipe to atmosphere, and a double check valve in said emergency pipe operated by the flow of fluid through either one of said brake valves to the emergency pipe for cutting off communication to the valve device at the opposite end.

7. In an air brake equipment, the combination with a source of fluid pressure, a brake cylinder, and an emergency pipe, of a sanding reservoir, a sanding pipe, and an emergency valve arranged to be operated upon a reduction in pressure in said emergency pipe to establish communication between said source of fluid pressure and said brake cylinder and between said sanding reservoir and said sanding pipe.

8. In an air brake equipment, the combination with a source of fluid pressure, a brake cylinder, and an emergency pipe, of a sanding reservoir connected to said emergency pipe, a sanding pipe, and an emergency valve arranged to be operated upon a reduction in pressure in said emergency pipe to establish communication between said source of fluid pressure and said brake cylinder and between said sanding reservoir and said sanding pipe.

9. In an air brake equipment, the combination with a source of fluid pressure, a brake cylinder, and an emergency pipe, of a sanding reservoir connected to said emergency pipe through a restricted passage, a sanding pipe, and an emergency valve arranged to be operated upon a reduction in pressure in said emergency pipe to establish communication between said source of fluid pressure and said brake cylinder and between said sanding pipe, said sanding reservoir and said emergency pipe.

10. In an air brake system, a source of fluid pressure, a door engine, a door pipe arranged to supply fluid pressure to one side of said door engine, means for supplying fluid pressure to said door pipe, and a door operating valve normally establishing communication between said source of fluid pressure and the other side of said engine and operated by fluid supplied to said door pipe to cut off communication between said source and last mentioned side of the door engine and to establish communication between said side and atmosphere.

11. In an air brake system, an emergency pipe, a door engine, a door pipe arranged to supply fluid pressure to one side of said engine, a brake valve controlling the supply of fluid to said door pipe, and a door operating valve normally adapted to establish communication between said emergency pipe and the other side of said engine and arranged to be operated by fluid supplied to said door pipe to cut off communication between said emergency pipe and last mentioned side and to establish communication between said side and atmosphere.

12. In an air brake equipment, the combination of a source of fluid pressure, a brake cylinder, and an emergency pipe, of a pipe connected to atmosphere, and an emergency valve arranged to be operated upon a reduction in pressure in said emergency pipe to connect said source of pressure to said brake cylinder and to connect said emergency pipe to said pipe connected to atmosphere through a restricted passage.

In witness whereof, I have hereunto set my hand this 20th day of April, 1921.

GEORGE MACLOSKIE.